May 22, 1945. W. H. RICHARDS 2,376,383
AUTOMATIC SHUT-OFF VALVE FOR GASOLINE BURNERS
Filed June 17, 1941
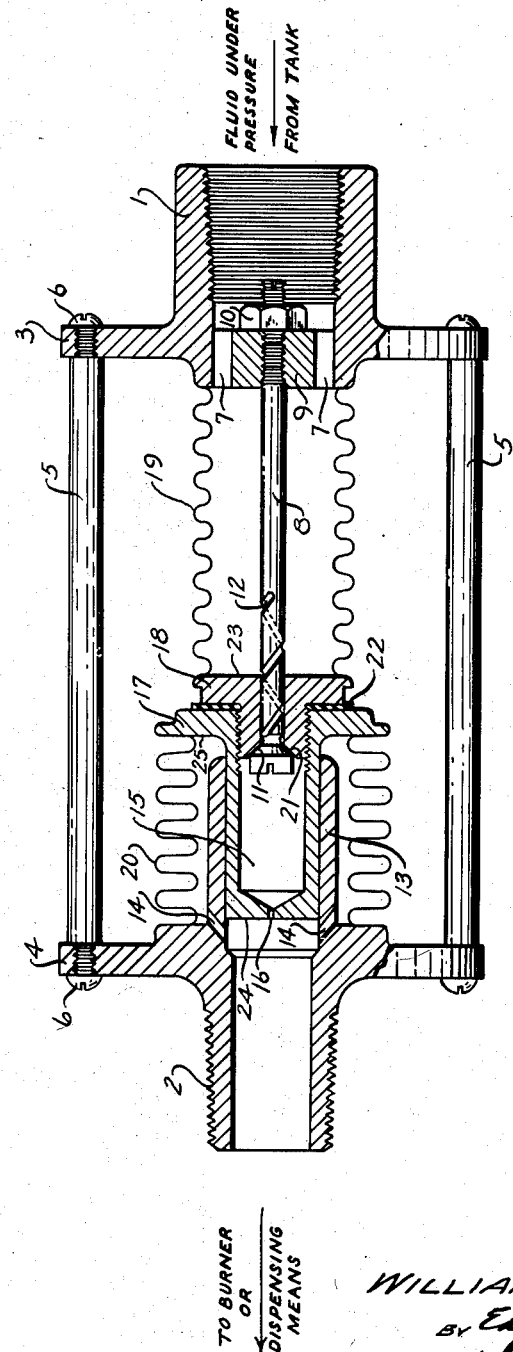
INVENTOR
WILLIAM H. RICHARDS Patented May 22, 1945

2,376,383

UNITED STATES PATENT OFFICE 2,376,383

AUTOMATIC SHUTOFF VALVE FOR GASOLINE BURNERS

William H. Richards, Dayton, Ohio

Application June 17, 1941, Serial No. 398,456

10 Claims. (Cl. 137—153)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a safety valve comprising an automatic shut-off valve adapted to be placed in a fuel line connecting a fuel tank under pressure to a burner such as a gasoline burner.

It is well known that the fire hazard is great when using gasoline burners operating from a source of fuel under pressure due principally to the danger from extinguishment of the burner flame without shutting off the fuel supply to the burner.

It is therefore an object of this invention to provide a safety valve for use in a fuel line under pressure to a burner, the valve permitting normal flow of fuel through the line as long as the burner is lighted and in operation, but automatically cutting off the flow of fuel substantially simultaneously with the extinguishment of the burner flame.

It is another object of this invention to provide in a fuel line, a safety valve automatically operated in response to a predetermined unbalancing of the pressure in the fuel line.

It is a further object of this invention to provide, in combination with a stationary valve seat, a floating valve member adapted to engage therewith and be operated by a pair of opposed Sylphons, the Sylphons operating to hold the valve in open position during normal fuel flow and to close the valve when the pressures on the opposed Sylphons are unbalanced by a change in the flow such a change being, for instance, from the somewhat restricted flow conditions existing when the burner is lighted to less restricted flow conditions such as exists when the burner flame has become extinguished.

Other objects of the invention will become apparent from the following description taken in connection with the accompanying drawing in which:

The single figure in the drawing is a cross-sectional view of the valve showing the parts in valve-closing position.

Referring to the drawing the valve is composed of a pair of spaced-apart coupling members, 1 and 2, having integral therewith respectively peripheral flanges 3 and 4. The coupling members are maintained in spaced relation by a suitable number of spacer elements 5, the ends of which are tapped for receiving screws 6, which also pass through suitable openings in the flanged portion of the couplings. Coupling member 1 is provided with a plurality of fluid passages 7. This coupling member has adjustably mounted thereon a valve stem 8 screw threaded at one end into portion 9 of that member and held in adjusted position by means of lock nut 10. The other end of the valve stem is provided with a valve seat 11 and a groove 12 constituting an orifice for the passage of fluid. This groove may be termed metering means. Coupling member 2 has integral therewith a guide sleeve member 13 having orifices 14 therein for the transmission of fluid pressure to face 25 for a purpose to be hereinafter more fully explained.

Coming now to the construction of the floating valve member, there is provided a hollow cylindrical member 15 slidably received in sleeve member 13 and having a flow controlling orifice 16 at one end and a flange 17 at the other end thereof. This other end is internally screw-threaded to operatively receive a correspondingly threaded member 18 having a tapered valve portion 21 therein corresponding to the seat 11 on the valve stem and a flanged portion 18. A sealing washer 22 is provided between members 17 and 18. Member 18 is in bearing engagement with valve stem 8 to slide freely thereon. Attached at one end to flanged portion 18 is a Sylphon 19, the other end of which is secured to the inner end of coupling member 1. Attached at one end to flanged portion 17 of member 15 is a Sylphon 20, the other end of which is attached to the inside of coupling member 2. These Sylphons, it will be noted, constitute an integral part of the fluid-fuel line. The effective pressure area of Sylphon 20 may be made somewhat greater than that on Sylphon 19 by a predetermined amount in order to better accomplish the new and novel results of this invention. This is accomplished by making the combined areas 24 and 25 greater than area 23.

In carrying out the invention, the valve is connected through the intermediary of coupling members 1 and 2, into a fuel line adapted to connect a fuel tank under pressure to a burner or to a receiving means under less pressure than the fuel tank. The burner, tank and line have not been shown because they are well known to those skilled in the art. However, the burner may be broadly designated as a restricted-flow dispensing means and the tank of fuel under pressure as pressurized reservoir means.

In operation, the floating valve member composed of members 17 and 18 is retracted manually to withdraw valve seating portion 21 away from valve seat 11 permitting flow of fluid through openings 7, orifices 12 and 16 and into the line leading to the burner. The burner is then lighted and the manual hold on the floating valve seat may be released since with the burner lighted a substantially balanced pressure condition is established on faces 23, 24 and 25 of the floating valve member. In other words as long as the flow in the line remains normal—even though variable—the pressures on the surfaces 23, 24 and 25 of members 17 and 18 will substantially balance, any unbalancing tendency being in favor of urging the floating valve member toward valve-opening positions due to the pressure areas 24 and 25 of Sylphon 20 being preferably larger than pressure area 23 of member 19. If the burner should be extinguished by, for instance, being blown out, the less restricted flow of vapor through the burner will be such as to unbalance the pressures in the Sylphons and force the floating valve member into the valve closing position illustrated in the drawing.

Although many theories have been advanced to explain the operation of this device, the most plausible one is that when the burner is lighted, there is present a certain amount of stabilizing back pressure in the line, this back pressure being sufficient to result in a sufficiently stabilized flow of fluid within the operative range of the burner to maintain the combined pressures on faces 24 and 25 substantially equal to or slightly in excess of that on face 23. Should the burner flame become extinguished by, for instance, being blown out, the burner back pressure will not then be present and the escape of gasoline vapor from the burner will unbalance the flow in the line, and particularly in the line as controlled by orifice 16, to such an extent that the pressure on face 23 will then be greater than the combined pressures on faces 24 and 25, resulting in movement of the valve to closing position.

Various modifications may be made in the device, it being intended to limit the invention only by the appended claims.

I claim:

1. For use in a line connecting a source of fluid under pressure and a receiving means under pressure, an automatic shut-off valve comprising a valve seat, a floating valve member having a pair of opposed pressure faces and a seat adapted to sealingly engage said valve seat, flexible means connected to each of said pressure faces and forming with said floating member a passageway between said inlet and outlet means, orifice means in said valve member for restricting fluid flow, means for applying the pressure in the said passageway to both of said faces and, in conjunction with said restricting means, for relieving pressure on the pressure face adjacent the receiving means side of said line prior to the relieving of pressure on the other of said pressure faces, whereby said valve member will be urged into closed position upon restricted flow in the receiving means side of the line.

2. An automatic shut-off valve comprising inlet means adapted to be connected to pressurized reservoir means, outlet means adapted to be connected to restricted-flow dispensing means, a valve-seat member and a valve member, one of which is floatingly mounted and provided with opposed pressure faces, a pair of opposed Sylphons one of which is operatively connected to one of said pressure faces and to said inlet means and the other of which is operatively connected to the other of said pressure faces and to said outlet means, and means for relieving pressure on said other face prior to the relieving of pressure on said one face under a condition of unrestricted flow in said outlet means, whereby said floating member is maintained in valve-open position under normal fluid-flow conditions and moves to valve-closing position under unrestricted fluid-flow conditions in said outlet means.

3. An automatic shut-off valve comprising inlet means adapted to be connected to pressurized reservoir means, outlet means adapted to be connected to restricted-flow dispensing means, means carried by said inlet means and including a valve seat, a valve member floatingly mounted on said means and having a surface adapted to sealingly engage said valve seat and a pair of opposed faces, a Sylphon connected to said inlet means and to one of said faces, a second Sylphon connected to said outlet means and to the other of said faces, said Sylphons and floating valve member comprising a fluid passageway between said inlet and outlet means, means for relieving pressure on one of said faces prior to the relieving of pressure on the other of said faces upon unrestricted flow in said outlet means, whereby said floating member is maintained in valve-open position by fluid pressure on said opposed faces under normal fluid-flow conditions and is moved to valve-closing position under unrestricted flow conditions in said outlet means.

4. An automatic shut-off valve comprising inlet and outlet means, a valve stem connected to one of said means and having a valve seat thereon, a valve member floatingly mounted on said valve stem and having a pair of opposed faces, a Sylphon attached to one of said faces and to said inlet means, a second Sylphon attached to the other of said faces and to said outlet means, said Sylphons and valve member comprising a metering fluid passageway between said inlet and outlet means, means including orifice means for relieving pressure on the face of said valve adjacent said outlet means under a condition of unrestricted flow in said outlet means, said orifice means having less resistance to flow than said metering fluid passageway.

5. An automatic shut-off valve comprising inlet and outlet means, fluid passage means connecting said inlet and outlet means including flow-metering means, a floating valve member operatively associated with said fluid passage means, said member having opposed faces arranged to be subjected to pressure in said fluid passage, the one of said opposed faces adjacent said outlet means being larger than the other of said faces, orifice means of less restriction than said metering means arranged for relieving pressure on the one of said opposed faces adjacent said outlet means prior to relieving pressure on the other of said faces under a condition of unrestricted flow in said outlet means.

6. An automatic shut-off valve comprising inlet means adapted to receive fluid under pressure, outlet means adapted to be connected to a controlled-pressure-dispensing means, fluid-passage means connecting said inlet and outlet means and including valve means floatingly mounted for movement to and from an open metering position, said valve means including opposed faces subjected to pressure of fluid in said passageway to maintain said valve in open position, the one of said opposed faces adjacent said outlet means being larger than the other of said faces, means of larger fluid-conducting capacity than said metered-flow in said passageway for conducting fluid from said passageway to and from the one of said opposed faces adjacent said outlet means.

7. An automatic shut-off valve comprising inlet means adapted to receive fluid under pressure, outlet means adapted to be connected to a controlled-pressure dispensing means, fluid-passage means connecting said inlet and outlet means and including a valve member floatingly mounted for movement from an open metering position to a closed position, a guiding stem having a seat for coaction with said valve member and a slot for metering fluid when said valve member is in open position, said valve member including opposed faces subjected to pressure of fluid in said passage to maintain said valve in open position, and means for relieving pressure on the one of said opposed faces adjacent said outlet means prior to relieving pressure on the other of said faces under a condition of sudden diminution of pressure in said outlet means, whereby said valve will be moved to closed position.

8. An automatic shut-off valve comprising inlet means adapted to receive fluid under pressure, outlet means adapted to be connected to a controlled-pressure dispensing means, fluid-passage means connecting said inlet and outlet means and including a valve member floatingly mounted for movement from an open metering position to a closed position and provided with a longitudinally extending fluid-receiving portion constituting a part of said fluid-passage means, inlet and outlet control means in the fluid-receiving portion of the said valve, said valve member including opposed faces subjected to pressure of fluid in said passage to maintain said valve in open position, and means for relieving pressure on the one of said opposed faces adjacent said outlet means pior to relieving pressure on the other of said faces under a condition of sudden diminution of pressure in said outlet means, whereby said valve will be moved to closed position.

9. An automatic shut-off valve comprising inlet means adapted to receive fluid under pressure, outlet means adapted to be connected to a controlled-pressure dispensing means, fluid-passage means connecting said inlet and outlet means and including a valve member floatingly mounted for movement from an open metering position to a closed position and provided with a longitudinally extending fluid-receiving portion constituting a part of said fluid-passage means, said fluid-receiving portion including inlet and outlet fluid-control means, said valve member including opposed faces subjected to pressure of fluid in said passage to maintain said valve in open position, means for conducting fluid from said fluid-receiving portion to and from the one of said opposed faces adjacent said outlet means, said conducting means being of considerably larger fluid-conducting capacity than said flow-control means, and means for relieving pressure on the one of said opposed faces adjacent said outlet means prior to relieving pressure on the other of said faces under a condition of sudden diminution of pressure in said outlet means, whereby said valve will be moved to closed position.

10. An automatic shut-off valve comprising inlet means adapted to receive fluid under pressure, outlet means adapted to be connected to a controlled-pressure dispensing means, fluid-passage means connecting said inlet and outlet means and including a valve member floatingly mounted for movement from an open metering position to a closed position, said valve member including opposed faces subjected to pressure of fluid in said passage to maintain said valve in open position, means in said valve member for controlling fluid flow in said fluid-passage means, means for conducting fluid from said fluid flow controlling means to the one of said opposed faces adjacent said outlet means, said conducting means being of larger fluid-conducting capacity than said flow control means, and means for relieving pressure on the one of said opposed faces adjacent said outlet means prior to relieving pressure on the other of said faces under a condition of sudden diminution of pressure in said outlet means, whereby said valve will be moved to closed position.

WILLIAM H. RICHARDS.